Oct. 25, 1966   J. A. BRACCO   3,280,867
NUTCRACKER
Filed Feb. 6, 1964
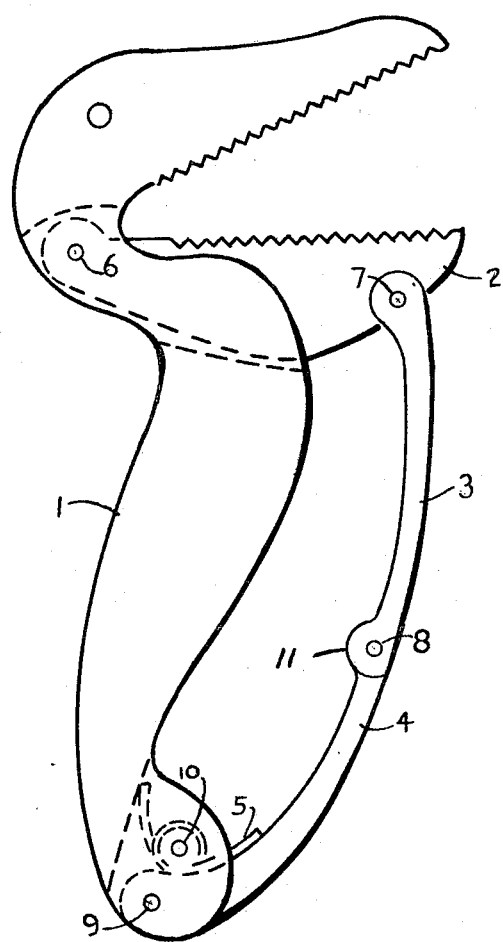
INVENTOR.
Joseph A. Bracco

United States Patent Office 3,280,867
Patented Oct. 25, 1966

1

3,280,867
NUTCRACKER
Joseph A. Bracco, 134 Centerport Road, Centerport, N.Y.
Filed Feb. 6, 1964, Ser. No. 343,028
2 Claims. (Cl. 146—13)

The object of this invention is to provide a manual implement employing a mechanical toggle action with which to crack such brittle matter as the shells of nuts and fish without either inadvertently crushing the contents of the shell or, because of the limiting action of the toggle, hurting its user whose hands might otherwise be caught in the cracking mechanism.

The invention consists of a hand tool which may be cast, die-stamped, machined or otherwise fabricated of brass, steel, iron, aluminum or other substantial metal or synthetic material. The tool is comprised of the following components as delineated in the accompanying drawing which forms part of this specification: (1) handle and upper cracking jaw, (2) lower cracking jaw, (3) upper portion of toggle, (4) lower portion of toggle, (5) spring for returning toggle to ready position, (6)–(9) hinged connecting points. The pin 6 pivotally connects the lower cracking jaw 2 to the handle 1 at the neck interconnecting the handle with the upper jaw proper. The pin 7 is a pivot between the upper end of toggle member 3 and the lower jaw 2 in the vicinity of the mouth-end of the jaw. Pin 8 is the pivot between the toggle members 3 and 4, and pin 9 pivotally connects the lower toggle member 4 with the lower part of handle 1.

The handle 1 at its lower end is shaped to present two interconnected disc-like parts 11 forming a mouth opening toward the toggle member 4. A pin 10 traverses the mouth formed between the disc-like parts and the spring 5 is curled around the pin 10 with its ends pressing on lower portion of toggle member 4 and the inner mouth surface of the handle respectively.

The tool is held in one hand, with fingers encircling but not pressing against the toggle. The nut, lobster claw or other brittle object to be cracked is then wedged with the other hand between the serrated upper (1) and lower (2) cracking jaws. Because the aperture between the jaws is triangular in conformity, objects of many sizes and shapes can be accommodated within the aperture without need of mechanical adjustments.

With the object thus held firmly between the cracking jaws, the toggle is then activated by applying manual pressure against it with a squeezing action. The conformation of the toggle in the inactive position is such that the hinge points lie along an arcuate line, hinged at points (7) and (8) and (9). Manual pressure flattens the arcuate line, forcing a closing action of the lower jaw hinged at point (6) toward the upper jaw. However, the closing action between the jaws is restricted to approximately one-fourth inch at the outer extremities. Hence, while the scope of the closure is adequate to crack the shell or other object, its limitation prevents the jaws from driving through the interior of the shell or object, and from accidentally trapping and injuring the hands of the user. It will also be noted that the hinge connections between the toggle members 3 and 4 is such that the outer surface of the hinge always presents a smooth, outwardly bowed, continuous, arcuate surface with the toggle parts thus enhancing its efficiency and further eliminating the

2 trapping and injuring of the hands of the user. The toggle is also limited in action by either the inherent design of the tool, or the provision of a stop 11 to prevent it from inverting and thereby locking. After each use of the tool, the toggle is returned to the ready position by the coil spring (5).

I am aware that many devices for cracking nuts, shell fish and other brittle matter are in common use, and do not broadly claim such devices as my invention.

I claim:

1. A manually operated instrument for cracking the shell of a food product without crushing the food product contained therein which comprises:

an upper jaw assembly including an upper jaw member having a rigid handle extending downwardly therefrom;

a lower jaw member pivotally connected at one end to said assembly adjacent the point of connection between the upper jaw and the extended handle and disposed in confronting, spaced relationship to said upper jaw member and being pivotally shiftable towards and away from the first jaw member; and, a toggle member connected between the lower jaw member and the handle, said toggle member comprising an upper portion and a lower portion of substantially equal length pivotally connected together at adjacent ends and extending therefrom, bowed outwardly from the handle so that the hinged parts lie along an arcuate line, the extended end of the upper portion being pivotally connected to the lower jaw member near the mouth forming portion thereof, the extended end of the lower portion of the toggle member being pivotally connected to the lower part of the handle, the toggle hinge thus being located in the center part of the bow so that when said toggle member is pivoted outwardly away from the handle it is bowed outwardly to open the jaws and when said toggle member is pivoted inwardly towards said handle the toggle portions are shifted to straight line relationship to pivot the jaws towards each other.

2. An instrument for cracking the shell of a food product without crushing the food product contained therein as set forth in claim 1 in which the said portions of the toggle member are provided with a stop adjacent the point where they are connected together so as to limit the opening of the jaws, and spring means are provided between the handle and toggle member to normally maintain the portions in engagement with the stop and the jaws in open position.

References Cited by the Examiner

UNITED STATES PATENTS

| 76,247 | 3/1868 | Pratt | 146—13 |
| 484,049 | 10/1892 | Robertson | 146—13 |
| 1,213,510 | 1/1917 | Leu | 146—13 |
| 2,610,534 | 9/1952 | Shaff | 81—379 |

FOREIGN PATENTS 335,636 10/1930 Great Britain.

ROBERT C. RIORDON, *Primary Examiner.*

W. GRAYDON ABERCROMBIE, *Examiner.*